United States Patent [19]

Tomko

[11] Patent Number: 5,790,668

[45] Date of Patent: Aug. 4, 1998

[54] METHOD AND APPARATUS FOR SECURELY HANDLING DATA IN A DATABASE OF BIOMETRICS AND ASSOCIATED DATA

[75] Inventor: George J. Tomko, East York, Canada

[73] Assignee: Mytec Technologies Inc., Don Mills

[21] Appl. No.: 574,724

[22] Filed: Dec. 19, 1995

[51] Int. Cl.$^6$ ........................................................ H04L 9/00
[52] U.S. Cl. ............................ 380/25; 380/4; 380/9; 380/23; 380/49; 380/50
[58] Field of Search .......................... 380/3, 4, 9, 21, 380/23, 25, 49, 50

[56] References Cited

U.S. PATENT DOCUMENTS

| | | |
|---|---|---|
| 4,876,725 | 10/1989 | Tomko . |
| 5,050,220 | 9/1991 | Marsh et al. . |
| 5,095,194 | 3/1992 | Barbanell . |
| 5,138,468 | 8/1992 | Barbanell . |
| 5,345,508 | 9/1994 | Lynn et al. . |
| 5,469,506 | 11/1995 | Berson et al. ............................ 380/23 |

FOREIGN PATENT DOCUMENTS

| | | | |
|---|---|---|---|
| 0 460 533 A | 12/1991 | European Pat. Off. .......... | G07C 9/00 |
| 4243908 A1 | 6/1994 | Germany .......................... | H04L 9/32 |

OTHER PUBLICATIONS

Proceedings of the 29th. Annual International Carnahan Conference on Security Technology, Sanderstead, GB, Oct. 18–20, 1995, No. Conf. 29, 18–20 Oct., 1995, Sanson L D (ED), pp. 397–401, XP000575565; Anna Stockel: "Securing Data and Financial Transactions".

Computer & Security International Journal Devoted to the Study of Technical and Financial Aspects of Computer Security, vol. 11, No. 4, Jul. 1, 1992, pp. 315–325, XP000294687, T.P. de Vries: "The Implemntation of TSS".

SIGSAC Review, vol. 10 No. 2/3, Spring/Summer 1992, NY US, pp. 44–62, S.Albert et al., "Reference Model for Data Management Security and Privacy".

ICL Technical Journal, Nov. 1982, pp. 175–188, R.W. Jones, "Some Techniques for Handling Encipherment Keys".

Computers & Security, vol. 7 No. 6, Dec. 1988, Oxford GB, pp. 575–597, J.Biskup et al., "The Personal Model of Data: Towards a Privacy–Oriented Information System".

IBM Tech. Disclosure Bulletin, vol. 35 No. 1B, Jun. 1992, "Use of biometric data to control use of cryptographic keys".

*Primary Examiner*—Bernarr E. Gregory
*Attorney, Agent, or Firm*—Marshall, O'Toole, Gerstein, Murray & Borun

[57] ABSTRACT

A person wanting an entitlement, such as welfare, typically inputs his fingerprint to a database. On a match with a fingerprint already in the database, a profile of the person with the matching fingerprint is retrieved to guard against double dipping. There is a concern for the privacy of the information in the database. To assure privacy, the profile associated with each fingerprint in the database is encrypted so that when a new person attempts to enroll and a matching fingerprint is found in the database, the associated profile returned is encrypted. In order to access this encrypted profile, PINs are required from one or two authorized operators. The PIN of an authorized operator is stored on a card in an encrypted fashion such that it may be recovered by the authorized operator inputting his fingerprint to the system. One or both PINs are needed to decipher the profile.

32 Claims, 4 Drawing Sheets

METHOD AND APPARATUS FOR SECURELY HANDLING DATA IN A DATABASE OF BIOMETRICS AND ASSOCIATED DATA

FIELD OF THE INVENTION

This invention relates to a method and apparatus for the secure handling of data for a database of biometrics and associated data.

DESCRIPTION OF THE RELATED ART

People who desire certain entitlements, such as welfare or health care insurance, may have their electronic fingerprints stored in a large database along with their profiles. These profiles include information about each individual such as their name, address, a digital photo, and the like. When a new person attempts to enroll, the electronic representation of his fingerprint is first checked against the database of fingerprints. If there is a match with a fingerprint already in the database, then the associated profile of the matching fingerprint in the database Is reviewed. This assists in preventing illicit double dipping. Unfortunately, however, privacy becomes an issue with such a system because fingerprints and profiles stored in the database can be scanned by anyone with access to the database. Furthermore, a digital fingerprint template could be constructed from a latent print (for example a print on a drinking glass) and this could be used to access the database to improperly obtain the profile of an individual.

Therefore, it is desirable to provide a method of preventing duplicate enrollment while still ensuring the privacy of individuals whose profiles are stored in the database.

SUMMARY OF THE INVENTION

According to the present invention, there is provided a method for the secure handling of data, comprising the steps of: acquiring a database of personal identifiers and data comprising, repetitively; (i) acquiring a personal identifier; (ii) acquiring data; (iii) encrypting said data with an encryption key such that said encrypted data has a decryption key; (iv) associating said encrypted data with said personal identifier in said database; (v) encrypting said decryption key utilising a personal identifier; (b) comparing a personal identifier of a given individual with the database and, on a match with a personal identifier in said database, obtaining encrypted data associated with said matching personal identifier; (c) obtaining a decryption key for the encrypted data with the following steps: (i) obtaining an encrypted version of said decryption key from storage; (ii) performing a decryption operation on said encrypted decryption key utilising said personal identifier of step (a)(v); (d) performing a decryption operation on the encrypted data with the key obtained in step (c) (ii).

According to another aspect of the invention, there is provided a method for the secure handling of data for a database of biometrics and associated data, comprising the steps of: a) acquiring a database of biometric representations and data comprising, repetitively: (i) acquiring a biometric representation; (ii) acquiring data; (iii) encrypting said data with an encryption key such that said encrypted data has a decryption key; (iv) storing said encrypted data at an address; (v) associating an address pointer pointing to said address with said biometric representation; b) comparing a biometric representation of a given individual with the database of biometric representations and, on a match with a biometric representation in said database, obtaining the address pointer associated with said matching biometric representation to retrieve encrypted data associated with said matching biometric representation; c) obtaining said decryption key for the encrypted data; d) performing a decryption operation on the encrypted data with said encrypted decryption key.

According to a further aspect of the invention, there is provided a method for the secure handling of data comprising the steps of: (a) acquiring a database of biometric representations and data comprising, repetitively: (i) acquiring a biometric representation and storing said biometric representation; (ii) acquiring data and storing said data; (iii) associating said data with said biometric representation by way of an address pointer between said biometric representation and said data; (iv) encrypting a said pointer utilizing said biometric representation as an encryption key and associating said encrypted address pointer with said biometric representation; (b) comparing a biometric representation of a given individual with said database and, on a match with a biometric representation in said database, obtaining said encrypted address pointer associated with said matching biometric representation; (c) decrypting said encrypted address pointer utilizing said biometric representation of said given individual; (d) retrieving data utilizing said address pointer associated with said matching biometric representation.

According to yet a further aspect of the invention, there is provided apparatus for the secure handling of data in a database of biometrics and data comprising the following: (a) a database of biometric representations and data with each biometric representation in said database being associated in the database with data and at least a portion of the data associated with each biometric representation being encrypted; (b) an input for a biometric of a given individual; (c) means responsive to said given individual biometric input for comparing a biometric representation of a given individual with the database of biometric representations and, on a match with a biometric representation in said database, for retrieving both encrypted data associated with said matching biometric representation and an encrypted version of a decryption key for said encrypted data; (d) an input for a biometric of an operator desiring access to said encrypted data; (e) means responsive to said operator biometric input for obtaining a decryption key for said encrypted decryption key; (f) means responsive to said means for obtaining a decryption key for said encrypted decryption key for performing a decryption operation on said encrypted decryption key; and (g) means responsive to said means for performing a decryption operation on said encrypted decryption key for performing a decryption operation on the encrypted data.

BRIEF DESCRIPTION OF THE DRAWINGS

In the drawings which illustrate example embodiments of the invention.

DETAILED DESCRIPTION OF THE PREFERRED EMBODIMENTS

As used herein, the term "biometric" means any physiological characteristic containing information which is unique for an individual. Example biometrics are person's fingerprints or irises.

Figure 1:
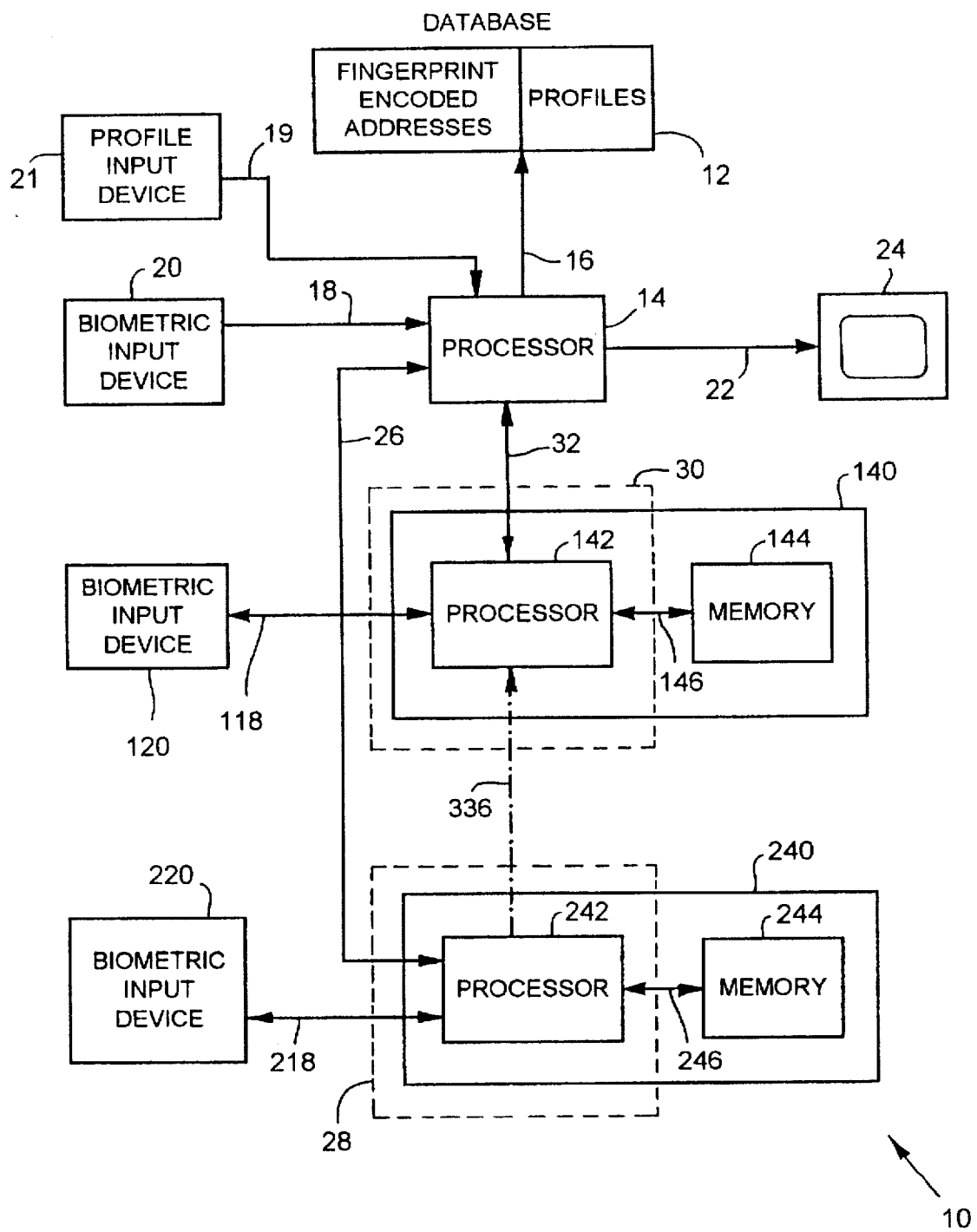
FIG. 1 is a schematic representation of a system made in accordance with this Invention.

Referring to FIG. 1, a system indicated generally at 10 for the secure handling of data in a database 12 of biometric representations and associated data comprises the following. A main processor 14 is connected for a two-way communication with database 12 on line 16. The processor receives an input from input device 20 on line 16 and an input from input device 21 on line 19. The main processor outputs on line 22 to monitor 24. The processor 14 is connected for two-way communication with docking station 28 on line 26 and is connected for two-way communication with docking station 30 via line 32. An input device 120 is connected for two-way communication with docking station 30 on line 118 and an input device 220 is connected on line 218 for two-way communication with docking station 28. Docking station 30 receives a smart card 140 with an on-board microprocessor 142 and a memory 144 which is connected for a two-way communication with the processor 142 on line 146. Similarly, docking station 28 receives a smart card 240 with an on-board processor 242 and memory 244 connected for two-way communication with the processor on line 246. When smart card 140 is in place in docking station 30, connections are made to processor 142 of the smart card on lines 32, and 118. Similarly, when smart card 240 is in place in docking station 28, lines 26 and 218 are connected through to the processor 242 of the smart card 240.

Input devices 20, 120, 220 are designed to allow the input of biometrics, preferably in the nature of fingerprints.

Figure 2:
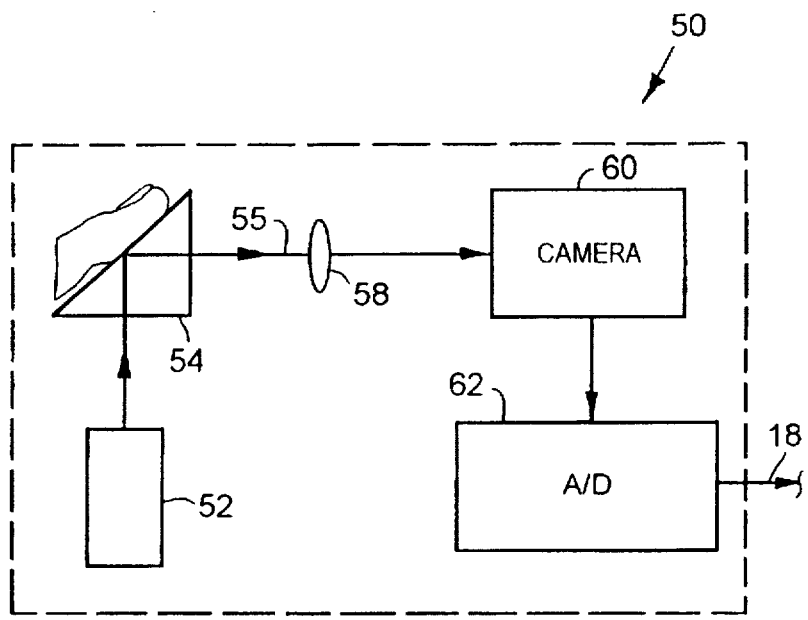
FIG. 2 is A detailed-schematic view of an example portion of FIG. 1.

FIG. 2 illustrates an example fingerprint input device which could be used for input device 20. Turning to FIG. 2, the fingerprint input device 50 comprises a source of light 52 which may be coherent, a total internal reflection prism 54, an imaging or Fourier transform lens 58, a camera 60 of the type which registers a two-dimensional array—such as a CCD or CMOS camera, and an analog to digital converter 62 outputting on line 18.

Figure 3:
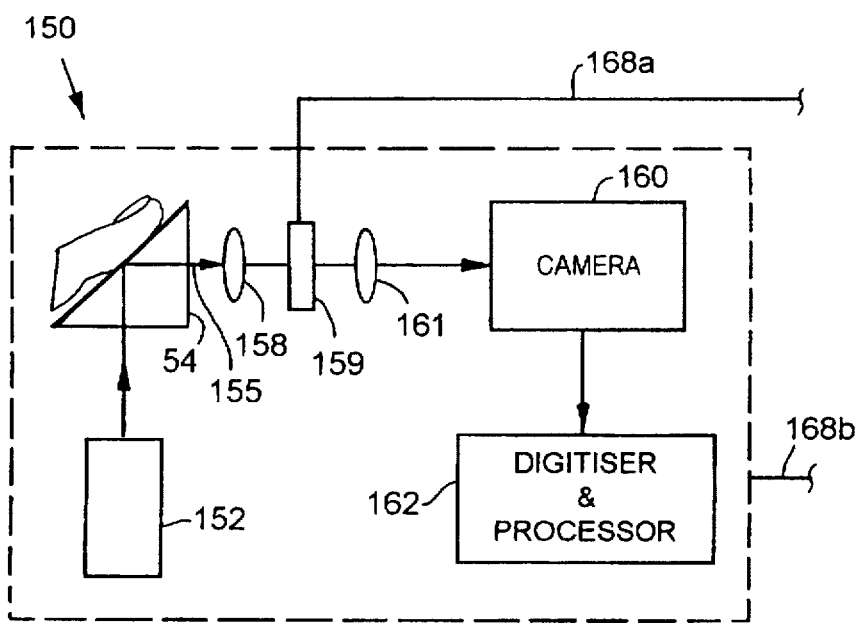
FIG. 3 is a detailed schematic view of a further example portion of FIG. 1.

FIG. 3 illustrates an example fingerprint input device 150 which could be used for both of input devices 120 and 220. Turning to FIG. 3, the fingerprint input device 150 comprises a source of light 152 which may be coherent, a total internal reflection prism 154, an imaging or Fourier transform lens 158, a spatial light modulator (SLM) 159 input on line 168a, a lens 161, a camera 160 of the type which registers a two-dimensional array—such as a CCD or CMOS camera, and a digitiser and processor 162 outputting on line 168b. When input device 150 is used as input device 120, lines 168a, 168b feed line 118 and when input device 150 is used as input device 220, lines 168a, 168b feed line 218.

Returning to FIG. 1, system 10 may be used in a method for the secure handling of data for database 12 of biometric representations and associated data as follows. Assuming the biometric is an individual's fingerprint, the individual who wishes to be enrolled for an entitlement (i.e., the target individual) may place his finger on input device 20. With input device 20 configured as input device 50 of FIG. 2, light source 52 illuminates prism 54 such that the fingerprint applied to the surface of prism 54 by the enrollee results in an output information beam 55 impressed with characteristics of the fingerprint. This output beam 55 is focused by a lens 58 onto camera 60 which outputs an analog signal to analog-to-digital converter 62. The resulting digital signal is output on line 68 which feeds line 18 of FIG. 1. The digital fingerprint signal is received by main processor 14 and the processor then compares the input fingerprint representation with each fingerprint entry in database 12. Each fingerprint entry in database 12 is actually an address number encoded by the information in a fingerprint. The encoding is accomplished in such a way that when the input fingerprint is compared with the fingerprint encoded address, the address will be returned provided the input fingerprint matches the fingerprint which has encoded the address. Techniques for encoding a sequence of random characters with a biometric representation such that the sequence of characters can be returned with the matching biometric representation are described in U.S. patent application Ser. No. 08/508,978 filed Jul. 28, 1995, the disclosure of which is incorporated herein by reference, now U.S. Pat. No. 5,712,912.

if none of the numbers returned by this comparison process are address numbers which point to a profile (i.e., associated data) in database 12, this indicates that the input fingerprint does not match any of the fingerprints of the fingerprint encoded addresses currently in the database. In such case, the processor uses the input fingerprint to encode an address, A, which is one of the free addresses for profiles in the database. The processor then stores the input fingerprint encoded address in the database 12.

Next, an operator working with the enrollee inputs profile data by way of profile input device 21. The processor encrypts the input profile data with a random encryption key, K, which is unique for each profile. This encryption key K is then combined with a random parameter R by way of an exclusive OR operation resulting in an initially encrypted decryption key KXR. The initially encrypted key ts then doubly encrypted by utilising a first public key $P_{K1}$ to return a doubly encrypted decryption key which is a function of both $P_{K1}$ and KXR, i.e., $P_{K1}(KXR)$. Next the random parameter R is encrypted with a second public key, $P_{K2}$, such that the encrypted version has the form $P_{K2}(R)$. The encrypted profile, as well as the two encrypted combinations $P_{K1}(KXR)$ and $P_{K2}(R)$, are then stored in database 12 at the address A which was encoded by the input fingerprint.

if, on the other hand, in comparing the input fingerprint with a fingerprint encoded address in the database, a valid profile address is returned, then the encrypted profile at this address, together with the doubly encrypted decryption key and the encrypted version of R stored with this profile, are retrieved by main processor 14. Since the profile data ts encrypted, an unauthorized operator of the system could not obtain useful information from the profile. Thus, even if an unauthorized operator input a latent print to the biometric input device 20 seeking information on the individual bearing that fingerprint, no useful information would be retrieved. On the other hand, authorized operators may obtain the information contained in the encrypted profile in the following fashion.

System 10 requires two authorized operators in order to decrypt a retrieved profile. Each authorized operator has a smart card. The memory of each one of the smart cards contains a private key for decrypting messages encrypted with a certain public key and a personal identification number (PIN) which is used to access the private key in memory. However, the PIN is stored in an encoded form. More particularly, the PIN is encoded with the fingerprint of the authorized bearer of the card. This encoding is done in such way that the PIN can be recovered only with the fingerprint of the authorized operator. Techniques for such encoding and decoding are disclosed in the aforereferenced U.S. patent application Ser. No. 08/508,978, the disclosure of which is incorporated herein by reference. Accordingly, a first authorized operator bears smart card 140 which contains a fingerprint encoded version of a first PIN p1, which PIN controls access to the private key for the first public key $P_{K1}$. Similarly, a second authorized operator bears smart card 240 storing a fingerprint encoded version of a second PIN p2, which PIN controls access to the private key for the second public key $P_{K2}$.

To access the retrieved profile data, the first authorized operator inserts his smart card 140 in docking station 30 and applies his fingerprint to biometric input device 120. Processor 142 on the smart card transmits the fingerprint encoded PIN p1 from the smart card memory 144 to the biometric input device 120 on line 118. With input device 120 configured as input device 150 of FIG. 3, line 118 feeds line 168a and the encoded PIN p1 is written as an optical filter to SLM 159. An optical information beam 155 impressed with characteristics of the input fingerprint passes through the SLM. If the input fingerprint matches the fingerprint in the fingerprint encoded PIN, an optical representation related to the decoded PIN p1 is recovered at camera 160. The decoded PIN p1 is then derived by digitising the camera output and applying a pre-set algorithm to the digitised version at digitiser and processor 162. The PIN is then transmitted back to smart card processor 142 on line 168b which feeds line 118. Main processor 14 passes the doubly encrypted decryption key $P_{K1}(KXR)$ to processor 142 on line 32. Processor 142 uses the PIN p1 to access the private key in smart card memory 144. The private key is then used by smart card processor 142 in an algorithm to recover the initially encrypted decryption key KXR from the doubly encrypted key. This is transmitted to main processor 14 on line 32 where it is held pending receipt of information from smart card processor 242 on line 26.

The second authorized operator inputs his smart card 240 in docking station 28 and passes his fingerprint over biometric input device 220. Utilizing the input fingerprint and the fingerprint encoded version of the second PIN p2 from memory 242, biometric input device 220 recovers the second PIN p2 which it passes to processor 242 on line 218. The encrypted version of R, $P_{K2}(R)$, is passed by the main processor 14 to the processor 242 on line 26. Smart card processor 242 then utilizes the second PIN p2 to access a private key stored in memory 244 which private key is used to decrypt the parameter R from $P_{K2}(R)$. The parameter R is then passed to processor 14 on line 26. Processor 14 combines the parameter R with the initially encrypted decryption key KXR in order to recover the decryption key K. Main processor 14 then utilizes K to decrypt the encrypted profile data. If both operators were indeed the authorized operators then the decrypted profile will appear on monitor 24. If, however, one or both of the operators are not authorized, then system 10 will not properly recover the unique decryption key K for the encrypted profile such that the profile will not be decrypted, and unintelligible information will appear on monitor 24.

In a second embodiment of this invention, an output line is added from docking station 28 to docking station 30, which line is illustrated in phantom at 336 in FIG. 1. For each profile, a first public key, $P_{K1}$, encrypts the random decryption key K for the profile to form an initially encrypted decryption key, $P_{K1}(K)$. The initially encrypted decryption key is then encrypted by a second public key, $P_{K2}$, to form a doubly encrypted decryption key $P_{K2}[P_{K1}(K)]$. This doubly encrypted key is stored at the address of the associated encrypted profile in database 12. In this instance, when an encrypted profile and the associated doubly encrypted decryption key are retrieved by the main processor 14, the doubly encrypted key $P_{K2}[P_{K1}(K)]$ is passed by processor 14 to docking station 28 on line 26. In the manner described in conjunction with the first embodiment, when an authorized operator inputs his smart card 240 to the docking station and his fingerprint via biometric input device 220, the smart card processor forwards a fingerprint encoded PIN p2 to the biometric input device 220 and receives the decoded PIN p2 back. This PIN is utilized to access a private key from smart card memory 244 and the private key is used to recover the initially encrypted key $P_{K1}(K)$ from the doubly encrypted key. The initially encrypted key is then passed to docking station 30 on line 336. If the other authorized operator has placed his smart card 140 in docking station 30 and input his fingerprint via biometric input device 120, then the smart card processor 142 of card 140 receives the decoded PIN p1 which is used to access a private key in order to decrypt the initially encrypted key received on line 36 so as to recover the decryption key K. This decryption key K is then passed on line 32 to processor 14 for use in decrypting the encrypted profile data.

While it is preferred that the decryption key K, and therefore the initially and doubly encrypted versions of K, be unique for each profile, a uniform decryption key could be used for the database 12. This would mean the initially and doubly encrypted versions of K would also be uniform. In such instance, the initially and doubly encrypted versions of K would not need to be stored with each profile but, instead, could be accessible from one location in database 12.

In some instances, certain data in the profile is less sensitive than other information. In such case, it may be desirable to allow access to such less sensitive data by a single authorized operator. In both the first and second embodiments described above, this may be implemented by encrypting this less sensitive data with another random key, K', and encoding this key K' solely with the first public key $P_{K1}$ and/or solely with the second public key $P_{K2}$. The encrypted version, or versions, of the key, $P_{K1}(K')$ and/or $P_{K2}(K')$, are then stored at the address A which was encoded by the input fingerprint. Consequently, on a match during enrollment, the encrypted version(s) of K' are returned and are passed to the appropriate docking station(s) 28 and/or 30. This allows either one or both of the authorised users to individually apply his fingerprint to his biometric input device and insert his smart card in his docking station to recover his PIN to access the private key which is used to decrypt K'. K' is then passed to the main processor 14 in order to decrypt the less sensitive data.

Although it is preferred that database 12 comprises fingerprint encoded address numbers, this is not necessary. Instead, an (unencoded) address may simply be stored along with each (unencoded) fingerprint and input fingerprints compared with each stored fingerprint in the database for a match. On a match, the associated address would then be used to access the encrypted profile.

In another embodiment which may be described in conjunction with FIG. 1, the addresses in the database may be encrypted rather than the profiles. In such case, the encrypted addresses comprise the associated data in the database of biometrics and associated data. More particularly, when an enrollee inputs his fingerprint in biometric input device 20, processor 14 scans the database 12. If no match is found, the processor obtains the next free address A for a profile and encrypts it with a random encryption key K. The processor then uses the input fingerprint to encode the encrypted address. Next the processor doubly encrypts the key K utilising either of the techniques of the previously described first and second embodiments. The doubly encrypted key (and, for the first embodiment, the encrypted version of the parameter R) is then stored with the fingerprint encoded encrypted address.

An operator working with the enrollee now inputs profile data by way of the profile input device 21. This data is then stored in plain text form at the address A chosen by the processor 14.

If, on enrolment, a match is found, then the encrypted address which had been encoded with the matching fingerprint is recovered. The processor will also retrieve the doubly encrypted key (and, for the first embodiment, the encrypted version of the parameter R) which had been stored with the fingerprint encoded encrypted address. As before, the two operators may insert their smart cards in their docking stations and input their fingerprints in order to return a decryption key for the encrypted address to the processor 14. The processor uses this to decrypt the address and then uses the decrypted address to retrieve a profile for display on monitor 24.

Ideally, there are two (or more) encrypted addresses associated with each biometric. In this instance, one address may point to a plain text profile which includes identifying information for the person, e.g., name, address and digital photograph. The second address may point to plain text profile which includes private information, such as health care records. With this approach, system administrators with access to the database could search on a persons name and pull up their identifying information to, for example, update an address. These administrators would, however, have no way of linking health care records with this identifying information.

For the first described embodiment of the invention, where two encrypted addresses are associated with a biometric, conveniently the parameter R may act as the decryption key for the address for the identifying information while the decryption key K decrypts the address for the private information.

Figure 4:
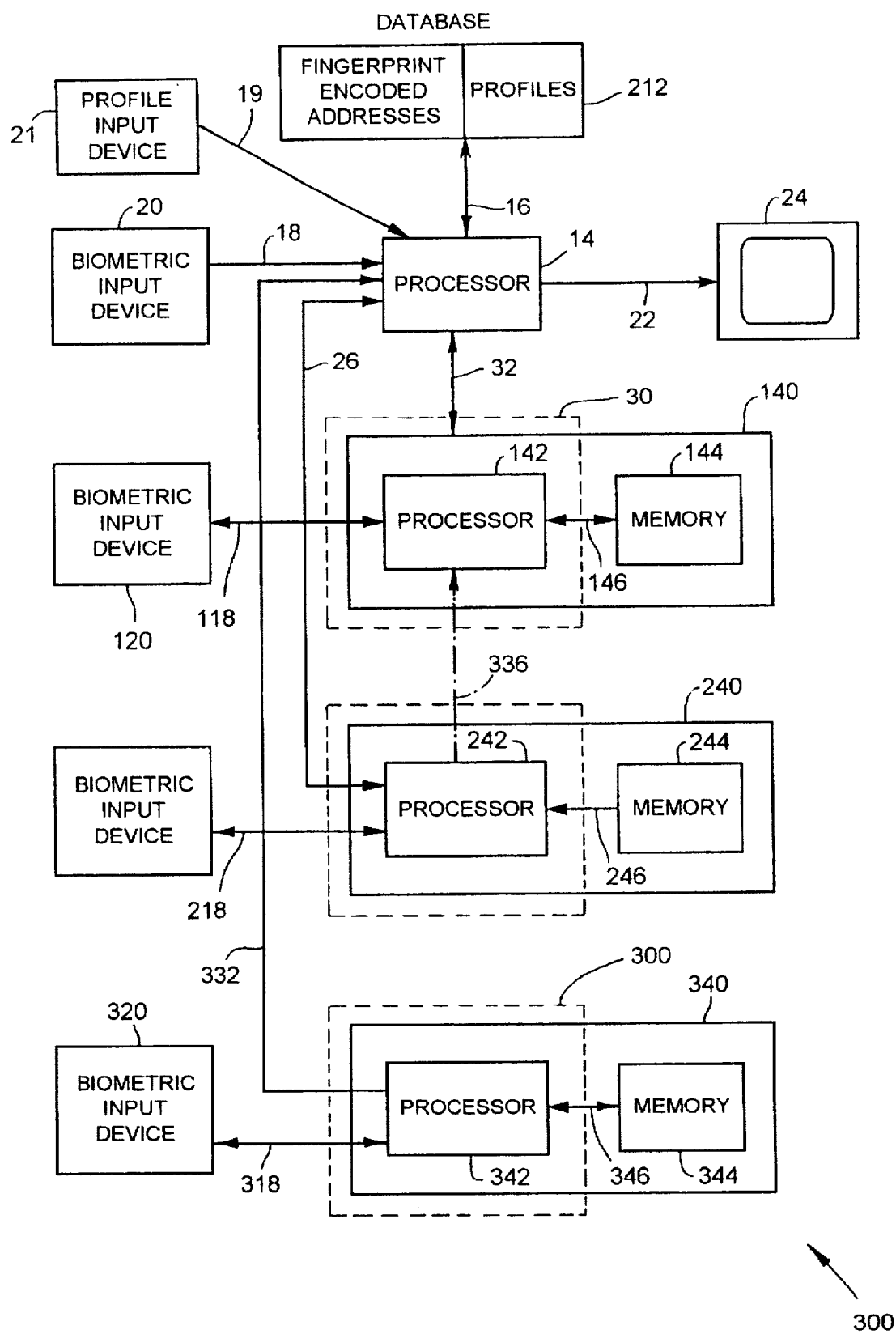
FIG. 4 is a schematic representation of a system made in accordance with another embodiment of this invention.

In some instances, it is desirable to encrypt the profiles, or at least profiles of private information, even where the addresses are encrypted as described above. In such case, the system of FIG. 4 is appropriate. Turning to FIG. 4 wherein like parts have been given like reference numerals, system 300 includes a biometric input device 320 coupled on line 318 for two-way communication with docking station 330. The docking station outputs to main processor 14 on line 332. A smart card 340, having a processor 342 and a memory 344 may be inserted in the docking station 330 so that the smart card processor is connected to lines 318 and 332. Biometric input device 330 may be configured as device 150 of FIG. 3.

In use of system 300, on enrollment, if no matching fingerprint is found in the database, an address is selected by the processor and doubly encrypted, as described in conjunction with the previous embodiment. Next, profile data is input. However, once the profile has been input, it is encrypted with a third public key, $P_{K3}$, before being stored at the selected address.

If, on enrollment, a matching fingerprint exists in the database, then the encrypted address encoded by the matching fingerprint is released. As described in conjunction with the previous embodiment, two operators may insert their smart cards in their docking stations 28, 30 and input their fingerprint in their blometric input devices 130, 220 in order to return a key, K, to the main processor 14 for decrypting the encrypted address. The processor will then retrieve the encrypted profile stored at the location pointed to by the decrypted address. Next a third operator may input his smart card 340 to docking station 330 and his fingerprint to biometric input device 320. The smart card processor 342 transmits a fingerprint encoded PIN to device 320 which returns the PIN. The PIN is then used by the smart card processor 342 to access a private key which is passed to the main processor 14 on line 332. This private key is used by the main processor to decrypt the encrypted profile, which is then displayed on monitor 24.

Figure 5:
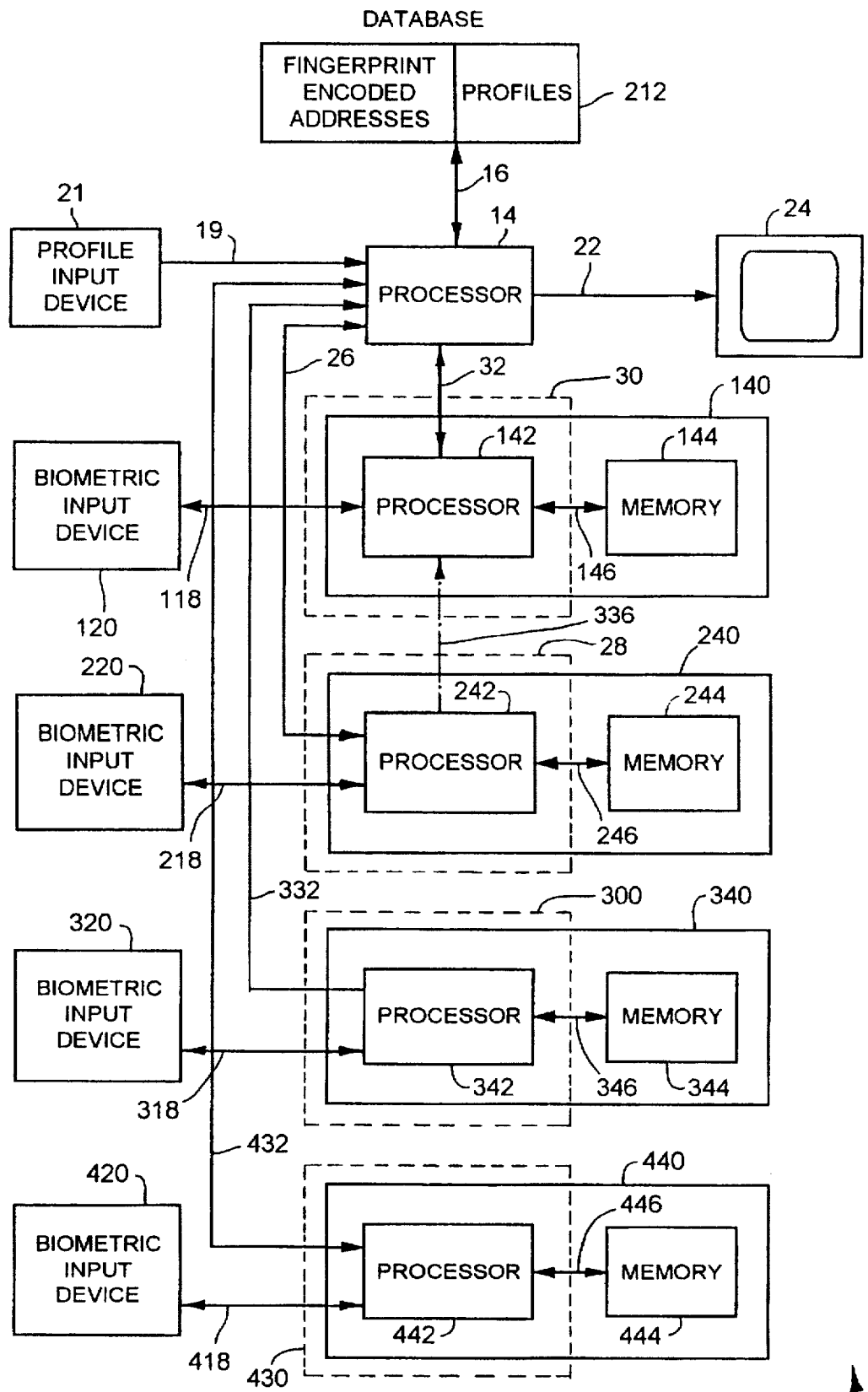
FIG. 5 is a schematic representation of a system made in accordance with further embodiment of this invention.

An option for system 300 is illustrated in FIG. 5. Turning to FIG. 5, system 400 includes docking station 430 connected for two-way communication on line 418 with biometric input device 420 and for two-way communication on line 432 with main processor 14. In this embodiment, the input device 420 is configured as input device 150 of FIG. 3. The docking station may receive a smart card 440 with a processor 442 and a memory 444.

With this option, enrollment is effected by way of biometric input device 420. On enrollment, the SLM 159 is transparent so as to have no filtering effect on the input fingerprint, which is simply passed to the main processor 14 after digitisation. Assuming no matching fingerprint is found by the main processor in database 212, the processor encrypts the selected address for the profile with a random key K, as described in conjunction with the embodiment of FIG. 4. In addition, the processor encodes a pointer to the encrypted address for the profile with the biometric of the enrollee. This fingerprint encoded pointer as well as the key K are then passed to card 440 for storage. With this option, an enrolled individual may, in conjunction with the authorised bearer of card 340, access the profile data, as follows. The enrolled individual may insert his smart card 440 in docking station 400 and pass his fingerprint over the input device 420. Utilising the input fingerprint and the fingerprint encoded pointer, the input device 420 will recover the pointer. This is passed to the database in order to return the encrypted address. The smart card processor 442 then utlises the key K which is stored in memory 444 to decrypt the address. This may then be passed to the main processor on line 432 thereby allowing the main processor to retrieve the encrypted profile. After the authorised bearer of card 340 inserts the card to docking station 330 and passes his fingerprint over the input device 320, the main processor receives a private key on line 332 which is used to decrypt the profile for display on monitor 24. This option has utility in, for example, a health care insurance database where the enrollee is a patient and the authorised bearer of card 340 is his health care professional. In this case, the docking station 300 and associated biometric device 320 and the docking station 400 and associated biometric device 420 may be mirrored by off-site components (e.g., at the health care professional's office).

While the systems have been described with a plurality of docking stations and associated biometric input devices, it will be obvious to those skilled in the art that the systems could be modified to employ a single docking station and associated blometric input device. In such instance, the authorised operators (and, if applicable, the enrollee) would be prompted by processor 14 to sequentially input both their smart card and fingerprint.

While the systems have been described in association with smart cards, it will be apparent that the systems could be modified to work with other smart "trusted" devices, such as PCMCIA cards.

Although the described public key encryption techniques are ideal for the encryption of the decryption keys (and in some cases for the profiles themselves where the volume of data encrypted is small), it will be apparent that other encryption techniques (such as techniques utilising secret— i.e., symmetric—keys) are possible in which decryption of the decryption keys (or profiles) is dependent upon the biometric of the operator(s).

Other modifications will be apparent to those skilled in the art and, therefore, the invention is defined in the claims.

What is claimed is:

1. A method for the secure handling of data, comprising the steps of:
   (a) acquiring a database of personal identifiers and data comprising, repetitively:
      (i) acquiring a person identifier;
      (ii) acquiring data;
      (iii) encrypting said data with an encryption key such that said encrypted data has a decryption key;
      (iv) associating said encrypted data with said personal identifier in said database;
      (v) encrypting said decryption key utilising a personal identifier;
   (b) comparing a personal identifier of a given individual with the database and, on a match with a personal identifier in said database, obtaining encrypted data associated with said matching personal identifier;
   (c) obtaining a decryption key for the encrypted data with the following steps:
      (i) obtaining an encrypted version of said decryption key from storage;
      (ii) performing a decryption operation on said encrypted decryption key utilising said personal identifier of step (a)(v);
   (d) performing a decryption operation on the encrypted data with the key obtained in step (c)(ii).

2. The method of claim 1 wherein said personal identifier of step (a)(v) comprises a personal identifier of an operator.

3. The method of claim 2 including the step of encrypting said decryption key and storing said encrypted decryption key and wherein sub-step (ii) of step (c) comprises utilising said operator personal identifier to obtain a first key for use in decrypting said encrypted decryption key.

4. The method of claim 3 including the step of storing a personal identifier encoded PIN and said first key and wherein sub-step (ii) of step (c) comprises utilising said operator personal identifier to decode said personal identifier encoded PIN and utilising said PIN to access said first key.

5. The method of claim 4 wherein said operator is a first operator and said operator personal identifier is a first personal identifier, wherein the step of encrypting said decryption key comprises doubly encrypting said decryption key and storing said doubly encrypted decryption key, and wherein sub-step (ii) of step (c) comprises performing a decryption operation on said doubly encrypted decryption key utilising a second personal identifier of a second operator desiring access to said encrypted data as well as said first personal identifier of said first operator.

6. The method of claim 5 wherein said personal identifier encoded PIN is a first personal identifier encoded PIN and including the step of storing a second personal identifier encoded PIN and a second key for said encrypted decryption key and wherein sub-step (ii) of step (c) comprises utilising said second personal identifier to decode said second personal identifier encoded PIN and utilising said second PIN to access said second key, said second key for, along with said first key, decrypting said doubly encrypted decryption key.

7. The method of claim 6 including the step of initially encrypting said decryption key with a first public key to obtain an initially encrypted decryption key and further encrypting said initially encrypted decryption key with a second public key to obtain said doubly encrypted decryption key.

8. The method of claim 7 wherein sub-step (c)(ii) comprises:
   retrieving said doubly encrypted decryption key from storage;
   decrypting said doubly encrypted decryption key utilising said first key as a private key to obtain said initially encrypted decryption key;
   decrypting said initially encrypted decryption key utilising said second key as a private key to obtain said decryption key.

9. The method of claim 8 including the step of storing said doubly encrypted decryption key with said encrypted data.

10. The method of claim 6 wherein the sub-step (i) of step (a) comprises acquiring a representation of a biometric and wherein sub-step (ii) of step (c) comprises performing a decryption operation on said doubly encrypted decryption key utilising a representation of a first biometric of said first operator and utilising a representation of a second biometric of said second operator.

11. The method of claim 9 including the step of initially encrypting said decryption key with a parameter to obtain an initially encrypted decryption key and further encrypting said initially encrypted decryption key with a public key to obtain said doubly encrypted decryption key.

12. The method of claim 11 including the step of encrypting said parameter with a public key and storing said public key encrypted parameter and wherein sub-step (c)(ii) comprises:
   retrieving said public key encrypted parameter from storage;
   decrypting said public key encrypted parameter utilising said second key to obtain said parameter;
   retrieving said doubly encrypted decryption key from storage;
   decrypting said doubly encrypted decryption key utilising said first key as a private key to obtain said initially encrypted decryption key;
   decrypting said initially encrypted decryption key utilising said parameter.

13. The method of claim 12 including the step of storing said doubly encrypted decryption key and said public key encrypted parameter with said encrypted data.

14. The method of claim 2 wherein said operator is a first operator and said operator personal identifier in a first personal identifier and wherein sub-step (ii) of step (c) comprises performing a decryption operation on said encrypted decryption key utilising a second personal identifier of a second operator desiring access to said encrypted data as well as said first personal identifier of said first operator.

15. The method of claim 2 wherein step (a) comprises acquiring a database of personal identifiers and data such that said encrypted data associated with each personal identifier is in the nature of an encrypted address, said encrypted address, when decrypted, pointing to further data and wherein step (b) comprises comparing a personal identifier of a given individual with the database and, on a match with a personal identifier in said database, obtaining the encrypted address associated with said matching personal identifier.

16. The method of claim 1 wherein step (a) comprises acquiring a database of personal identifiers such that each personal identifier has an associated address pointing to associated encrypted data and wherein step (b) comprises comparing a personal identifier of a given individual with the database and, on a match with a personal identifier in said database, obtaining the address associated with said matching personal identifier to retrieve encrypted data associated with said matching personal identifier.

17. The method of claim 16 wherein step (a) comprises encoding said associated address with said each personal identifier such that when a personal identifier of a given individual matches a personal identifier in said database of personal identifiers, the associated address is returned from the personal identifier encoded address corresponding to said matching personal identifier.

18. A method for the secure handling of data for a database of biometrics and associated data, comprising the steps of:
 a) acquiring a database of biometric representations and data comprising, repetitively;
  (i) acquiring a biometric representation;
  (ii) acquiring data;
  (iii) encrypting said data with an encryption key such that said encrypted data has a decryption key;
  (iv) storing said encrypted data at an address;
  (v) associating an address pointer pointing to said address with said biometric representation;
 b) comparing a biometric representation of a given individual with the database of biometric representations and, on a match with a biometric representation in said database, obtaining the address pointer associated with said matching biometric representation to retrieve encrypted data associated with said matching biometric representation;
 c) obtaining said decryption key for the encrypted data;
 d) performing a decryption operation on the encrypted data with said encrypted decryption key.

19. The method of claim 18 wherein step (a) comprises encoding said associated address pointer with each said biometric representation such that when a biometric representation of a given individual matches a biometric representation in said database of biometric representations, the associated address pointer is returned from the biometric representation encoded address pointer corresponding to said matching biometric representation.

20. Apparatus for the secure handling of data in a database of biometrics and data comprising the following:
 (a) a database of biometric representations and data with each biometric representation in said database being associated in the database with data and at least a portion of the data associated with each biometric representation being encrypted;
 (b) an input for a biometric of a given individual;
 (c) means responsive to said given individual biometric input for comparing a biometric representation of a given individual with the database of biometric representations and, on a match with a biometric representation in said database, for retrieving both encrypted data associated with said matching biometric representation and an encrypted version of a decryption key for said encrypted data;
 (d) an input for a biometric of an operator desiring access to said encrypted data;
 (e) means responsive to said operator biometric input for obtaining a decryption key for said encrypted decryption key;
 (f) means responsive to said means for obtaining a decryption key for said encrypted decryption key for performing a decryption operation on said encrypted decryption key; and
 (g) means responsive to said means for performing a decryption operation on said encrypted decryption key for performing a decryption operation on the encrypted data.

21. The apparatus of claim 20 wherein said operator biometric input is a first operator biometric input and including an input for a biometric of an second operator desiring access to said encrypted data and wherein said means responsive to said first operator biometric input is also responsive to said second operator biometric input.

22. The apparatus of claim 21 wherein said means reponsive to said first operator biometric input and said second operator biometric input comprises a first docking station for reception of a first storage and processing card and a second docking station for reception of a second storage and processing card.

23. A method for the secure handling of data, comprising the steps of:
 (a) acquiring a database of representations of biometrics and data comprising, repetitively:
  (i) acquiring a representation of a biometric;
  (ii) acquiring data;
  (iii) encrypting said data with an encryption key such that said encrypted data has a decryption key;
  (iv) associating said encrypted data with said representation of a biometric in said database;
  (v) encrypting said decryption key utilising a personal identifier of an operator;
 (b) comparing a representation of a biometric of a given individual with the database and, on a match with a representation of a biometric in said database, obtaining encrypted data associated with said matching representation of a biometric;
 (c) obtaining a decryption key for the encrypted data with the following steps:
  (i) obtaining an encrypted version of said decryption key from storage;
  (ii) performing a decryption operation on said encrypted decryption key utilising a representation of a biometric of said operator;
 (d) performing a decryption operation on the encrypted data with the key obtained in step (c)(ii).

24. The method of claim 23 including the step of encrypting said decryption key and storing said encrypted decryption key and wherein sub-step (ii) of step (c) comprises utilising said operator biometric representation to obtain a first key for use in decrypting said encrypted decryption key.

25. The method of claim 24 including the step of storing a biometric representation encoded PIN and said first key and wherein sub-step (ii) of step (c) comprises utilising said operator biometric representation to decode said biometric representation encoded PIN and utilising said PIN to access said first key.

26. The method of claim 25, wherein said operator is a first operator and said operator biometric representation is a first biometric representation, wherein the step of encrypting said decryption key comprises doubly encrypting said decryption key and storing said doubly encrypted decryption key, and wherein sub-step (ii) of step (c) comprises performing a decryption operation on said doubly encrypted decryption key utilising a second biometric representation of a second operator desiring access to said encrypted data as well as said first biometric representation of said first operator.

27. The method of claim 23 wherein said operator is a first operator and said operator biometric representation is a first biometric representation and wherein sub-step (ii) of step (c) comprises performing a decryption operation on said encrypted decryption key utilising a second biometric representation of a second operator desiring access to said encrypted data as well as said first biometric representation of said first operator.

28. The method of claim 23 wherein step (a) comprises acquiring a database of biometric representations such that each biometric representation has an associated address pointing to associated encrypted data and wherein step (b) comprises comparing a biometric representation of a given individual with the database and, on a match with a biometric representation in said database, obtaining the address associated with said matching biometric representation to retrieve encrypted data associated with said matching biometric representation.

29. The method of claim 28 wherein step (a) comprises encoding said associated address with said each biometric representation such that when a biometric representation of a given individual matches a biometric representation in said database, the associated address is returned from the biometric representation encoded address corresponding to said matching biometric representation.

30. The method of claim 23 wherein step (a) comprises acquiring a database of biometric representations and data such that said encrypted data associated with each biometric representation is in the nature of an encrypted address, said encrypted address, when decrypted, pointing to further data and wherein step (b) comprises comparing a biometric representation of a given individual with the database and, on a match with a biometric representation in said database, obtaining the encrypted address associated with said matching biometric representation.

31. A method for the secure handling of data comprising the steps of:
(a) acquiring a database of biometric representations and data comprising, repetitively:
  (i) acquiring a biometric representation and storing said biometric representation;
  (ii) acquiring data and storing said data;
  (iii) associating said data with said biometric representation by way of an address pointer between said biometric representation and said data;
  (iv) encrypting said pointer utilizing said biometric representation as an encryption key and associating said encrypted address pointer with said biometric representation;
(b) comparing a biometric representation of a given individual with said database and, on a match with a biometric representation in said database, obtaining said encrypted address pointer associated with said matching biometric representation;
(c) decrypting said encrypted address pointer utilizing said biometric representation of said given individual;
(d) retrieving data utilizing said address pointer associated with said matching biometric representation.

32. The method of claim 31 wherein said retrieved data is encrypted and including the steps of:
(e) obtaining a decryption key for the encrypted data with the following steps:
  (i) obtaining an encrypted version of said decryption key from storage;
  (ii) performing a decryption operation on said encrypted decryption key utilizing a biometric representation of an operator desiring access to said encrypted data;
(f) performing a decryption operation on the encrypted data with the key obtained in sub-step (ii) of step (e).

* * * * *

UNITED STATES PATENT AND TRADEMARK OFFICE
CERTIFICATE OF CORRECTION

PATENT NO. : 5,790,668
DATED : August 4, 1998
INVENTOR(S) : George J. TOMKO

It is certified that error appears in the above-identified patent and that said Letters Patent is hereby corrected as shown below:

Claim 11, column 10, line 23, cancel "9" and insert --10--.

Signed and Sealed this

Eighth Day of December, 1998

Attest:

BRUCE LEHMAN

*Attesting Officer*  *Commissioner of Patents and Trademarks*